Dec. 2, 1958 C. R. A. GRANT 2,862,388
FLUID PRESSURE GAUGES
Filed Aug. 11, 1955 2 Sheets-Sheet 2

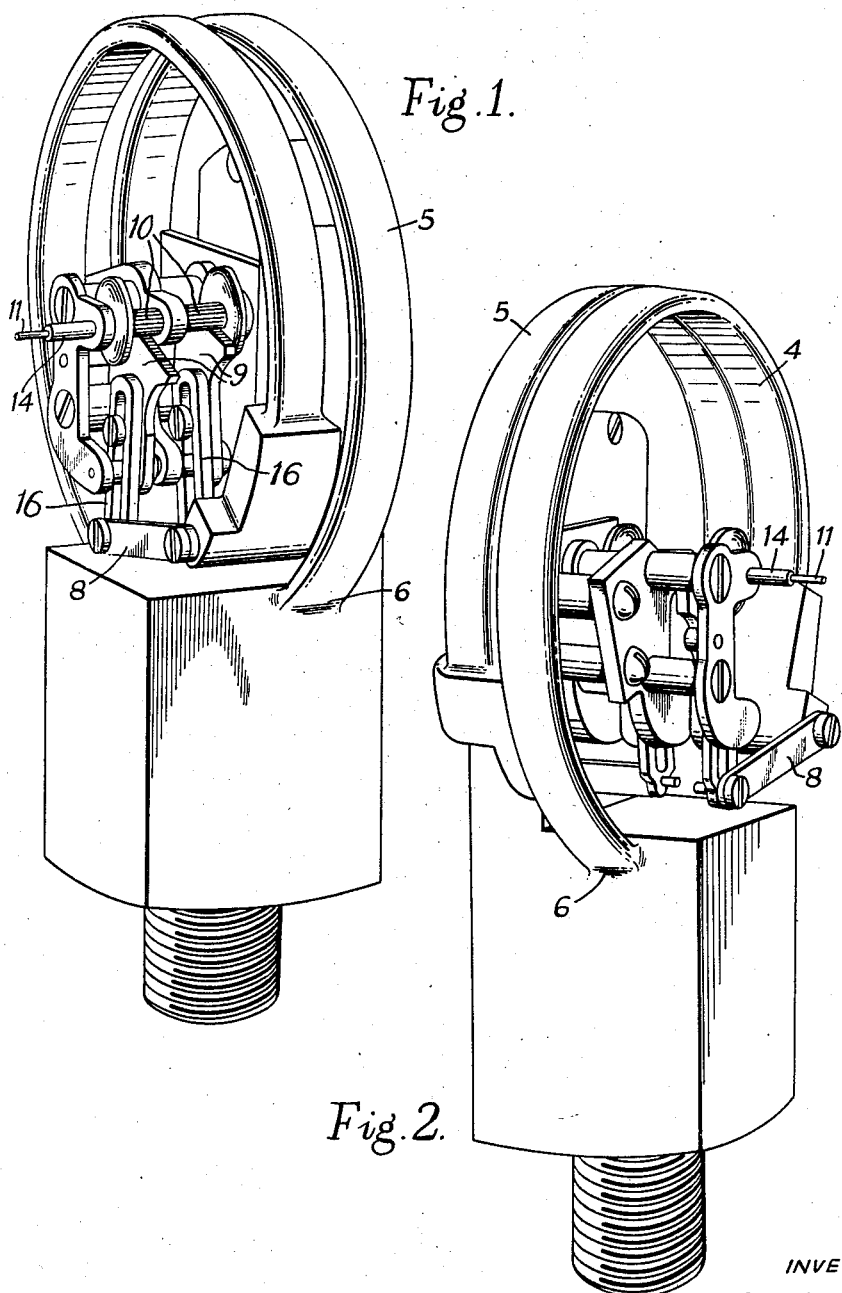

INVENTOR
Charles R. A. Grant
BY
Stevens, Davis, Miller & Mosher
ATTORNEYS

United States Patent Office 2,862,388
Patented Dec. 2, 1958

2,862,388

FLUID PRESSURE GAUGES

Charles R. A. Grant, Codicote Bury, Hitchin, England, assignor to Pressure Gauges Limited, Dublin, Eire Application August 11, 1955, Serial No. 527,733

Claims priority, application Great Britain August 13, 1954

2 Claims. (Cl. 73—412)

This invention relates to fluid pressure gauges and more particularly to gauges employing Bourdon tubes as the pressure-sensitive element and intended for use as test gauges. A distinction is drawn between a test gauge and an ordinary gauge in that a test gauge is intended to be a much more accurate instrument than an ordinary gauge and is employed for calibration of ordinary gauges to a reasonably high degree of accuracy. A test gauge requires to have an accurary of at least ±¼%, whereas on an ordinary gauge a much larger tolerance is possible. On the test gauge it must be capable of repeatedly being subjected to its maximum or full scale pressure and to maintain the accuracy mentioned above after a large number of operations. The difficulties in constructing such a gauge are arranging that friction in the indicating mechanism should be reduced to a minimum and arranging that elastic hysteresis of the metal of the Bourdon tube does not cause an error greater than the required tolerance. From the point of view of reducing inaccuracies due to elastic hysteresis, it is necessary to arrange that the actual movement of the Bourdon tube is quite small over the full scale deflection of the indicator. This means either a considerable "gearing up" from the movement of the Bourdon tube to the indicator which results in considerable friction, or the use of a Bourdon tube of a plurality of convolutions which results in a gauge which is not capable of withstanding mechanical shock and cannot maintain the necessary accuracy for any length of time.

The object of the present invention is to provide a test gauge particularly of the Bourdon tube variety in which for full scale movement the pressure sensitive elements or Bourdon tubes do not move under full scale conditions to an extent sufficient to reduce inaccuracy due to elastic hysteresis and yet at the same time avoids the necessity for "gearing up" of the indicator and provides a pressure-sensitive element which is reasonably resistant to mechanical shock.

In accordance with the present invention, a fluid pressure gauge includes a pair of Bourdon tubes or other pressure-sensitive elements, each Bourdon tube or element operating a separate simple indicating device, the indicating devices co-operating together so that a total reading on both devices is easily available. By this means, by using normal Bourdon tubes or pressure-sensitive elements to obtain a scale length of normal size, the Bourdon tubes or the like need only be deflected to half their normal extent for a given full scale pressure. Thus, inaccuracies due to hysteresis are very much reduced.

Referring to the drawings:

Figures 1 and 2 are perspective views showing the main component parts of a test gauge in accordance with the invention.

Figure 3:
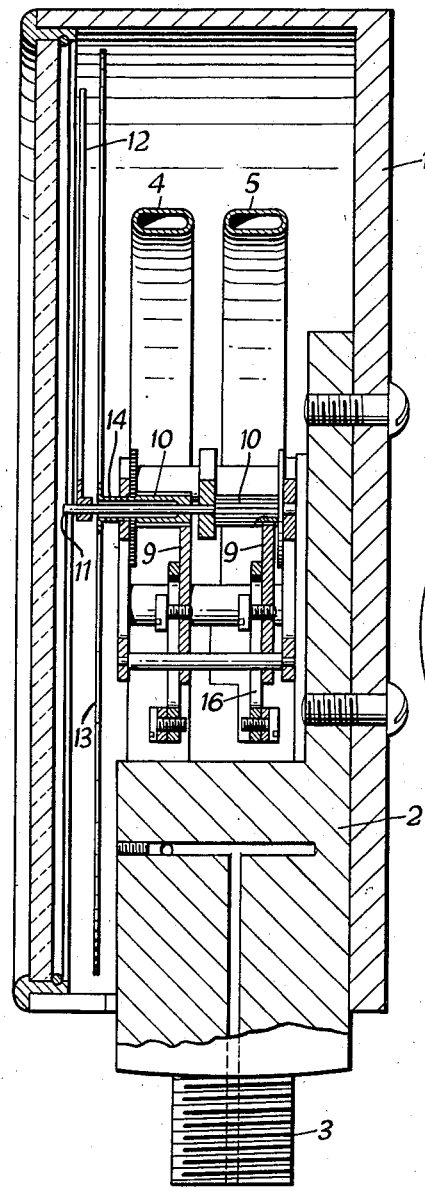
Figure 3 is a vertical sectional view drawn to an enlarged scale.
Figure 4:
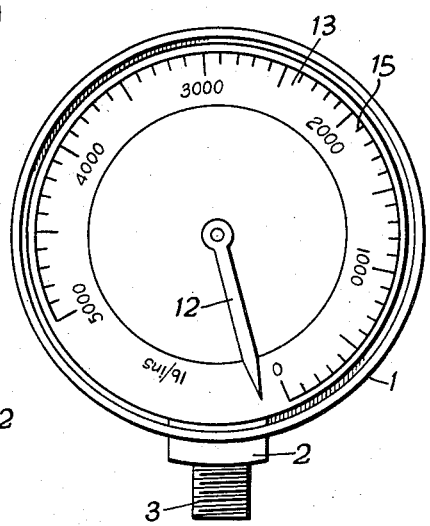
Figure 4 shows the complete gauge in front elevation.

In the illustrated embodiment of a fluid pressure gauge in accordance with the present invention, a casing 1 of the normal shape is provided in which is mounted a block 2 from which extends the usual screw-threaded pipe connection 3. Two Bourdon tubes 4 and 5 extend from the block from points 6 in opposite directions, these tubes extending for an angle of about 250° so that their ends considerably overlap one another. To prevent the free ends of the tubes coming into actual contact, the planes of the tubes are displaced one from the other on the block as shown clearly in Figure 3. The tubes are connected with a fluid duct formed in the block and common to both tubes, the duct being shown in Figure 3. The free end of each tube is indirectly connected by a link 8 to a pivoted quadrant 9, each quadrant engaging with a pinion 10. The two pinions 10 are concentrically arranged for rotation about the same axis, the rearmost pinion being connected by a shaft 11 to rotate a needle 12 whilst the front pinion rotates a circular dial 13 attached to sleeve 14 on which dial the actual scale 15 is marked, the arrangement being that when fluid pressure is applied, the opposite movements of the Bourdon tubes cause opposite rotation of the needle and dial. A reading taken from this gauge is, of course, the position of the pointer relative to the dial. For use, it is desirable that the gauge should be arranged for counting so that the axis of the dial and needle is vertical to avoid any difficulties due to unbalance. Instead of using a needle which co-operates with a scale on the dial a second dial may be employed, one dial having an arrow or other marking which co-operates with the scale on the other dial.

In the construction shown the links 8 are connected with the quadrants 9 by slotted links 16 which permit of adjustment when the components of the gauge are initially assembled. A gauge made in this way for a similar scale movement at a similar pressure requires only half the Bourdon tube movement, thus reducing inaccuracies due to hysteresis. By this means, for a given scale movement and a given maximum pressure, the Bourdon tubes may be made more rigidly and thus the whole gauge is more resistant to mechanical shock, also the acceleration of each tube, as a result of suddent increments of pressure is reduced to half that of a normal gauge resulting in reduced wear on the working parts possibly with the exception of the center spindle on which the needle is mounted.

Whilst this construction is suitable for a test gauge, it can with advantage be used for an ordinary gauge capable of withstanding double the overload of a gauge of normal construction using the same kind of Bourdon tube or pressure-sensitive element.

I claim:

1. A fluid pressure gauge for permanent use as a test gauge; said fluid pressure gauge comprising a calibrated dial mounted for rotation, a pointer mounted for rotation about the same axis of rotation as the dial and superimposed over the face of the dial, a pair of oppositely arranged Bourdon tubes disposed in parallel planes, each tube having a free end, means connected between the free end of one tube and the dial for rotating the dial in one direction of rotation, means connected between the free end of the other tube and the pointer for rotating the pointer in the opposite direction of rotation and a common connection for the Bourdon tubes for admitting a common fluid pressure to the tubes, whereby the movement of one tube is added to the movement of the other tube in giving a pressure reading by the dial and the pointer.

2. A fluid pressure gauge for permanent use as a test gauge; said fluid pressure gauge comprising a calibrated dial mounted for rotation, a pointer mounted for rotation about the same axis of rotation as the dial and superimposed over the face of the dial, a pair of oppositely arranged Bourdon tubes disposed in parallel planes, each tube having a free end, means connected between the free end of one tube and the dial for rotating the dial in one direction of rotation, means connected between the free end of the other tube and the pointer for rotating the pointer in the opposite direction of rotation and a common connection for the Bourdon tubes for admitting a common fluid pressure to the tubes, whereby the movement of one tube is added to the movement of the other tube in giving a pressure reading by the dial and the pointer; said tubes being arcuate, said common connection including a base block having an inlet connection, one end of one tube being fixed to the block in communication with the inlet connection with the other end thereof being free and one end of the other tube being fixed to the block in communication with the inlet connection and disposed adjacent the free end of the one tube and having its opposite free end disposed adjacent the fixed end of the one tube.

References Cited in the file of this patent

UNITED STATES PATENTS

| | | |
|---|---|---|
| 104,593 | Hovey | June 21, 1870 |
| 900,371 | Hopkins | Oct. 6, 1908 |
| 1,175,979 | O'Connor | Mar. 21, 1916 |
| 2,166,153 | Huck | July 18, 1939 |
| 2,706,407 | Hosford | Apr. 19, 1955 |